(12) United States Patent
Wang

(10) Patent No.: US 8,550,436 B2
(45) Date of Patent: Oct. 8, 2013

(54) SPINDLE FOR A WINCH

(76) Inventor: Shang An Wang, New South Wales (AU)

( * ) Notice: Subject to any disclaimer, the term of this patent is extended or adjusted under 35 U.S.C. 154(b) by 13 days.

(21) Appl. No.: 13/130,328

(22) PCT Filed: Nov. 9, 2009

(86) PCT No.: PCT/AU2009/001455
§ 371 (c)(1),
(2), (4) Date: Aug. 12, 2011

(87) PCT Pub. No.: WO2010/057244
PCT Pub. Date: May 27, 2010

(65) Prior Publication Data
US 2011/0284678 A1    Nov. 24, 2011

(30) Foreign Application Priority Data
Nov. 20, 2008    (AU) ................................ 2008905987

(51) Int. Cl.
*B21F 9/00*    (2006.01)
*B66F 3/00*    (2006.01)

(52) U.S. Cl.
USPC ............................ 254/223; 254/217; 254/222

(58) Field of Classification Search
USPC .................. 254/217, 218, 222, 223, 239, 240
See application file for complete search history.

(56) References Cited

U.S. PATENT DOCUMENTS

| | | | |
|---|---|---|---|
| 3,670,589 A | 6/1972 | Carter | |
| 3,998,429 A * | 12/1976 | Cheung | 254/218 |
| 6,431,525 B1 | 8/2002 | Roll | |
| 6,824,339 B1 * | 11/2004 | Childers | 410/103 |
| 7,413,170 B2 * | 8/2008 | Ruan | 254/244 |
| 7,472,890 B2 * | 1/2009 | Huang | 254/223 |
| 7,559,729 B2 * | 7/2009 | Ruan | 410/103 |
| 7,566,194 B1 * | 7/2009 | Gray et al. | 410/103 |
| 7,618,021 B2 * | 11/2009 | Leone et al. | 254/223 |
| 8,302,751 B2 * | 11/2012 | Ruan | 192/46 |
| 2003/0085392 A1 | 5/2003 | Hsieh | |
| 2007/0114504 A1 | 5/2007 | Ruan | |
| 2007/0264098 A1 * | 11/2007 | Chou | 410/103 |
| 2007/0267611 A1 * | 11/2007 | Leone et al. | 254/218 |

* cited by examiner

*Primary Examiner* — Emmanuel M Marcelo
(74) *Attorney, Agent, or Firm* — Davis & Bujold, PLLC; Michael J. Bujold

(57) ABSTRACT

A spindle for a winch which comprises a first member for winding a length of a restrain and a second member for rotationally driving the first member. The second member engages with the first member by way of an arrangement which only permits relative rotational movement between the first and second members in one direction. A portion of the second member is received into a bore in the first member to support the second member with respect to the first member.

14 Claims, 5 Drawing Sheets

SPINDLE FOR A WINCH

This application is a National Stage completion of PCT/AU2009/001455 filed Nov. 9, 2009, which claims priority from Australian patent application Ser. No. 2008 905987 filed Nov. 20, 2008.

FIELD OF THE INVENTION

The present invention relates to a winch, and particularly relates to a spindle for a winch used to restrain loads carried on a truck or the like.

BACKGROUND OF THE INVENTION

Drivers of trucks and the like are typically required by law to ensure that loads they carry are properly restrained. Proper restraint of loads is required to ensure the safety of other road users.

One technique used for restraining a palletted load on the bed of a truck is to utilise a length of webbing and a winch. One end of a length of chain or webbing is secured at one edge of the truck bed, is passed over the palletted load, and the free end is wound onto the winch. The winch includes a spindle which is driven by inserting one end of a bar into an aperture through the spindle and rotating the bar. A pawl on the winch cooperates with a series of teeth on the spindle to keep the winch in a tightened state.

The truck body obstructs rotation of the bar, thus the winch is tightened in a series of part rotations. The bar is rotated through a partial turn, is removed, and re-inserted into the spindle in its initial rotational position so that it can be turned again. The spindle continues to be turned a little at a time until the desired tension in the webbing is achieved.

The continual removal and re-insertion of the bar into the spindle is time consuming, particularly in the case of soft, compressible loads. Thus, it has been tried to provide a ratchet mechanism in the spindle. The bar is rotated to tighten the winch, and when its limit of rotation is reached it can be rotated back to its starting position without removing it from the aperture. The winch is kept tight by the existing pawl mechanism, and the ratchet mechanism allows the bar to rotate back to its starting position. However, to date these ratchet type mechanisms have been found to be very vulnerable to failure.

SUMMARY OF THE INVENTION

In a first aspect the present invention provides a spindle for a winch including:
a first member for winding a length of a restraint; a second member for rotationally driving the first member; the second member engages with the first member by way of an arrangement which permits relative rotational movement between the first and second members in one direction only; and a portion of the second member is received into a bore in the first member to support the second member with respect to the first member.

The portion of the second member may be a sliding fit in the bore of the first member.

The second member may enagge with the first member by way of a ratchet arrangement which may include at least one cam and a plurality of followers.

The followers may be oriented to move radially with respect to the axis of rotation of the spindle.

The followers may be mounted on leaf springs.

The followers may engage the cam in a compressive mode.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1:
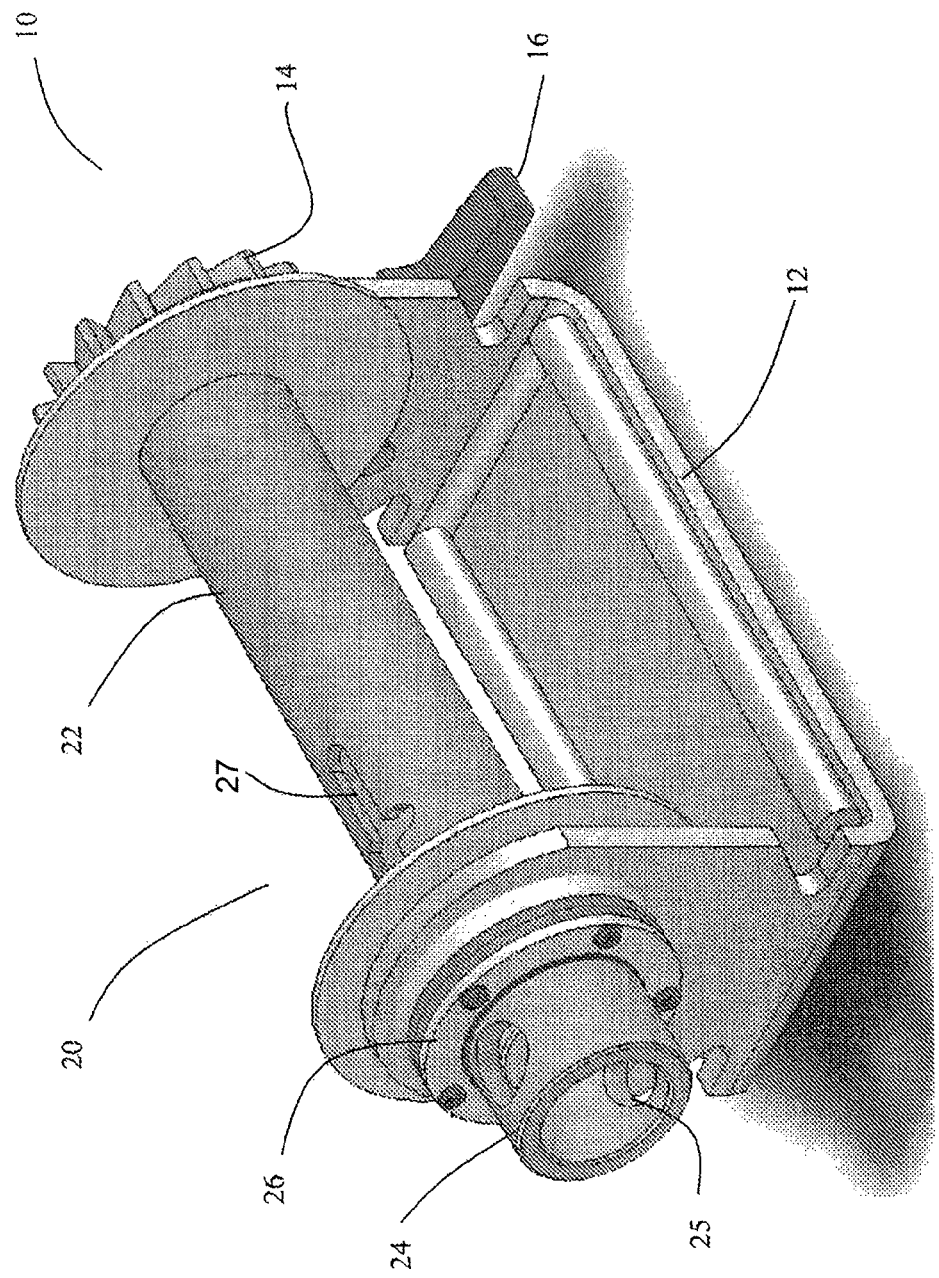
FIG. 1 is a perspective view of a winch including a first embodiment of a spindle according to the invention.

Referring to FIG. 1, a winch 10 is shown which includes a frame 12 which carries a spindle 20. The winch 10 is for use on a truck and in use is mounted at the underside of the bed of a truck by way of carriage 12. The spindle 20 includes a first member in the form of spool 22 which is designed to wind a flexible restraint member such as a length of webbing or a chain. The spindle 20 includes an aperture 27 which receives the free end of the restraint to commence winding. A pawl 16 is provided which engages with teeth 14 to keep the winch in a tightened state. To release the restraint, the pawl 16 is released from teeth 14 in a known manner.

Spindle 20 further includes a second member in the form of capstan 24. Capstan 24 is mounted to spool 22 by way of a ratchet mechanism 26 which allows relative rotational movement between the capstan and the spool in one direction only as will now be described.

Figure 2:
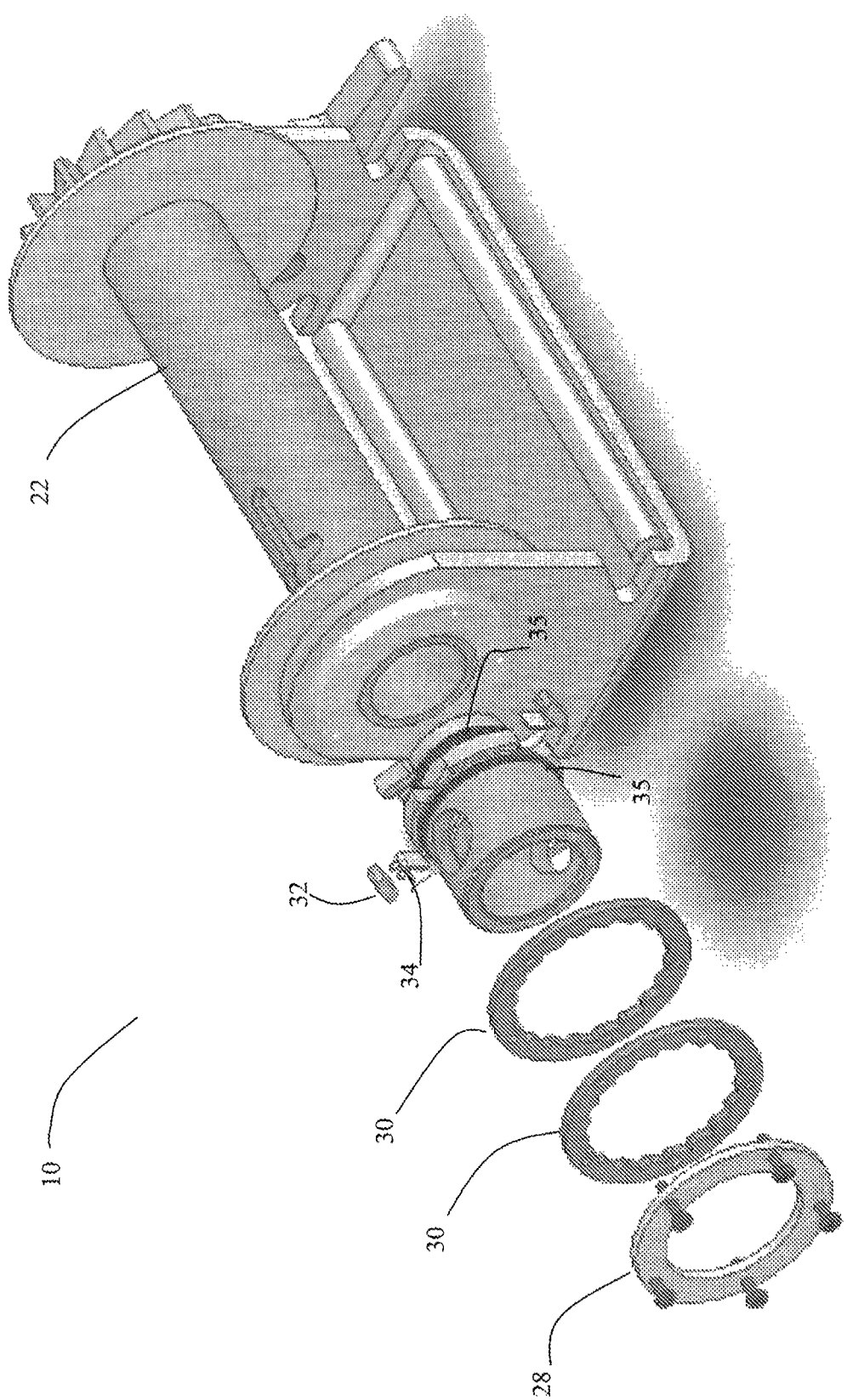
FIG. 2 is an exploded view of the winch of FIG. 1.

Referring to FIG. 2, the ratchet mechanism is shown in exploded view and includes a cam formed from two teethed rings 30 and a plurality of followers 32 which are mounted on leaf springs 34 which are formed from bent strips of metal to bias them to move radially outwardly to engage with the teeth on rings 30. A cap plate 28 secures the ratchet mechanism together. Two rubber O rings 35 are mounted in grooves in capstan 30 to prevent dirt or moisture from entering the ratchet mechanism. In some embodiments, one toothed ring is used instead of two.

Figure 3:
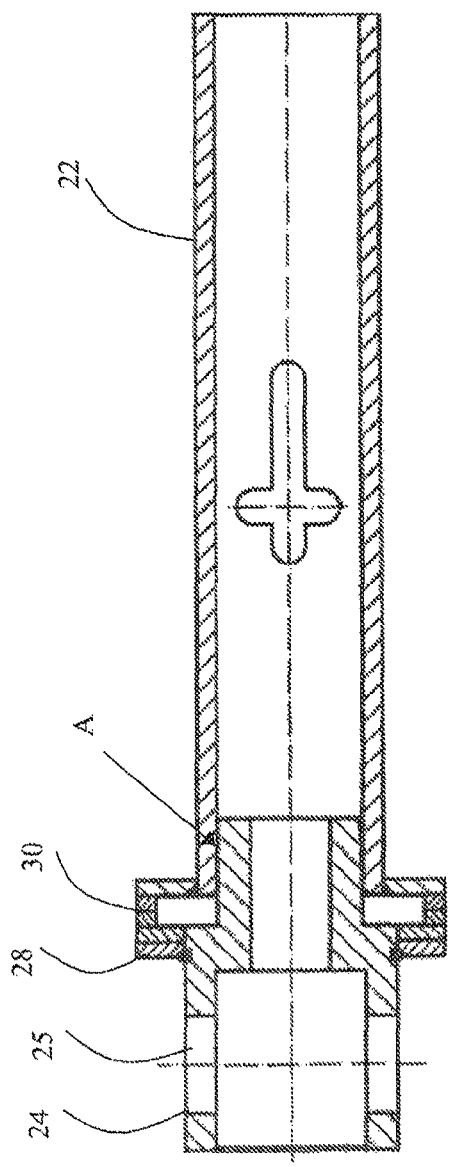
FIG. 3 is a cross sectional view of the spindle of the winch of FIG. 1.
Figure 6:
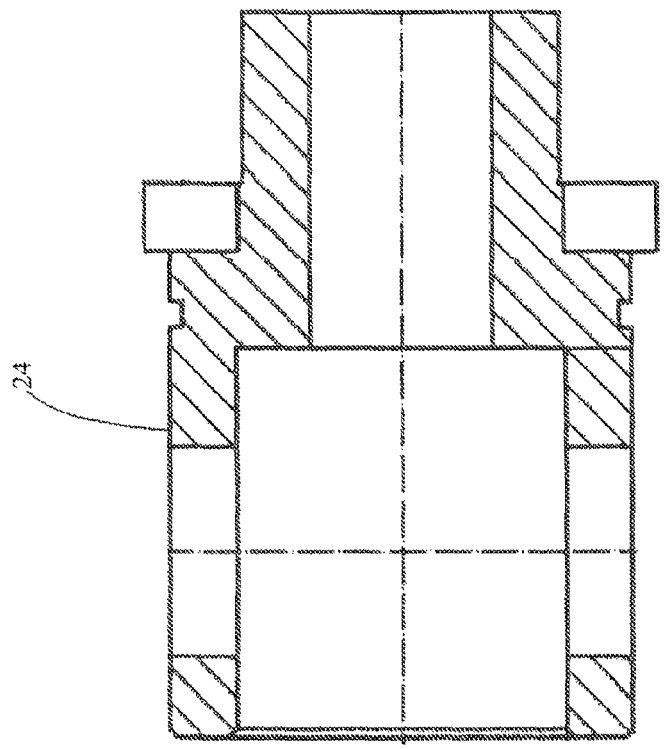
FIG. 6 is a cross sectional view of the capstan of FIG. 1.
Figure 5:
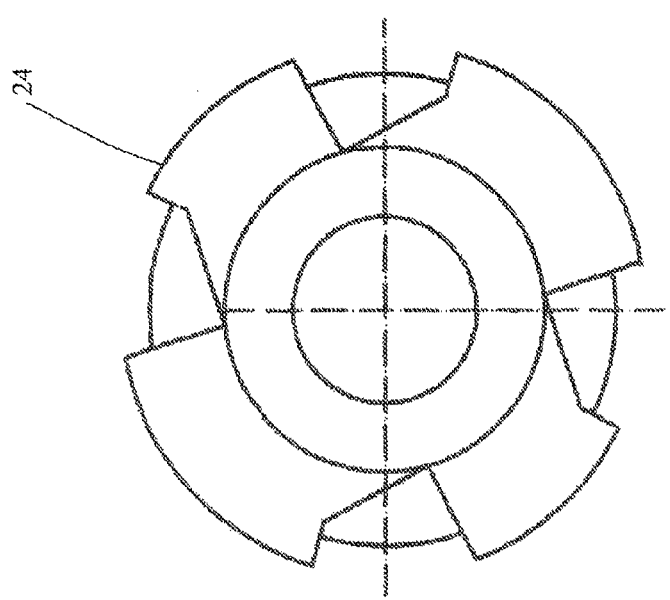
FIG. 5 is an end view of the capstan of the winch of FIG. 1.

Referring to FIG. 3, in the region indicated by arrow A it can be seen that a portion of the capstan 24 extends into, and is a sliding fit inside, a bore provided in the center of spool 22. This arrangement serves to support the capstan with respect to the spool and resists the large forces that can be experienced when the bar is inserted through apertures 25 in capstan and is used to tighten the winch.

Figure 4:
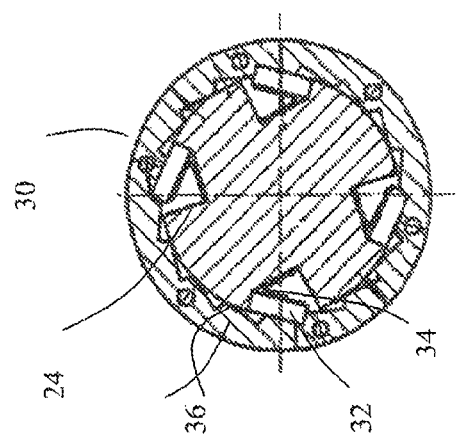
FIG. 4 is a cross sectional view of the ratchet mechanism of the winch of FIG. 1.

Referring to FIG. 4, the operation of the cam and followers is evident. The followers 32 are biased to move radially outwardly to engage with teeth 36 provided about the inside of ring 30. As seen in FIG. 4, if the capstan 24 is turned in a counter clockwise direction, then the followers bear against teeth 36 to drive the spool in an counter clockwise direction. However, if the capstan is rotated in a clockwise direction, then the followers may slip past the teeth by compression of the leaf springs 34. During this movement the spool is restrained from moving in a clockwise direction by the pawl 16 and teeth 14 arrangement (see FIGS. 1 & 2). Thus, a bar inserted in apertures 25 may be rotated back and forth in a series of clockwise and anti-clockwise part turns without removing the bar from the capstan and the restraint will become progressively tightened.

Figure 8:
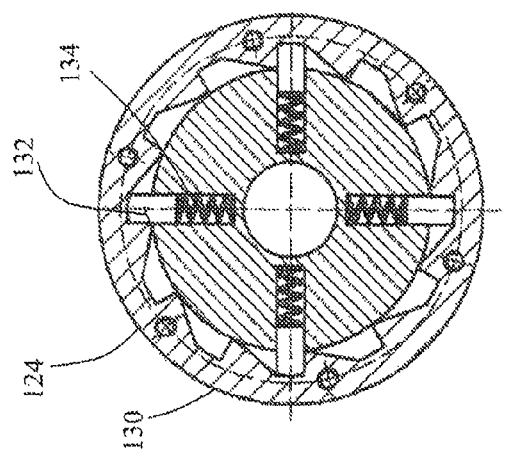
FIG. 8 is a cross sectional view of the ratchet mechanism of the spindle of FIG. 7.
Figure 7:
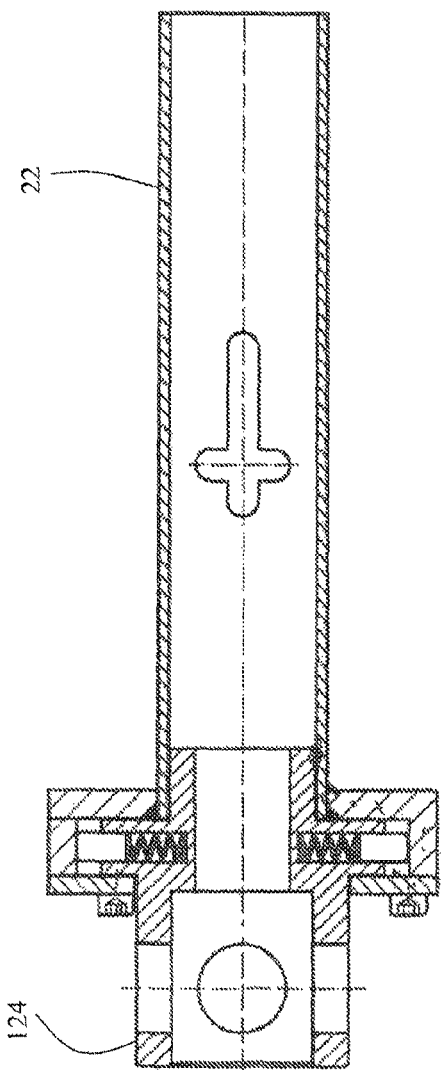
FIG. 7 is a cross sectional view of a second embodiment of a spindle according to the invention.

Referring to FIGS. 7 and 8, an alternative embodiment of the invention is shown where like reference numerals in the series 100-199 are used to indicate components corresponding to the first embodiment. In this embodiment, the followers 132 are mounted on coil springs 134 seated in apertures in capstan 124. The followers in this embodiment operate in a shear mode, rather than a compressive mode.

It can be seen that embodiments of the invention have at least the following advantages:

Rapid tightening of restraint saves time

Capstan is supported by the spool to lend strength to the winch to extend service life.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A spindle for a winch including:
   a first member for winding a length of a restraint;
   a second member for rotationally driving the first member;
   the second member engages with the first member by way of an arrangement which permits relative rotational movement between the first and second members in only one direction;
   a portion of the second member being received into a bore in the first member to support the second member with respect to the first member;
   the second member includes radially outwardly projecting portions, and
   a cap plate surrounding the second member and securing the second member to the first member by trapping the projecting portions.

2. The spindle according to claim 1, wherein the portion of the second member has a sliding fit in the bore of the first member.

3. The spindle according to claim 1, wherein the second member engages with the first member by way of a ratchet arrangement which includes at least one cam and a plurality of followers which form the projecting portions.

4. The spindle according to claim 3, wherein the plurality of followers are oriented to move radially with respect to an axis of rotation of the spindle.

5. The spindle according to claim 3, wherein the plurality of followers are mounted on leaf springs.

6. The spindle according to claim 3, wherein the plurality of followers engage the cam in a compressive mode.

7. The spindle according to claim 3, wherein and the at least one cam and the cam followers are located between fasteners for the cap plate and the rotational axis of the first member.

8. A spindle comprising:
   a first member for winding a length of a restraint, and a first end of the first member supporting a plurality of teeth;
   a leading end of a second member being received within a bore formed within the second end of the first member for rotatably supporting the second member with respect to the first member and permitting relative rotational rotation between the first and the second members so that the second member facilitates rotationally driving the first member in only one rotational direction,
   the second member supporting a plurality of cam followers which are spring biased radially outward away from a rotational axis of the first member,
   at least one ring member supporting a radially inward facing cam surface for releasable engaging with the plurality of cam followers, and
   a cap plate at least partially surrounding the second member and coupling the at least one ring member and the second member to the first member, and the cap plate being secured to the first member by fasteners which are spaced radially from the rotational axis of the first member.

9. The spindle according to claim 8, wherein the end of the second member which is received within the bore formed within the second end of the first member has a sliding fit.

10. The winch according to claim 8, wherein the plurality of cam followers are each baised radially outward radially away from the rotational axis of the first member by a respective leaf spring.

11. The winch according to claim 8, wherein the cam and cam followers are located between the fasteners for the cap plate and the rotational axis of the first member.

12. A winch comprising a spindle supported by a frame, the spindle comprising:
   a first member for winding a length of a restraint, and a first end of the first member supporting a plurality of teeth;
   the frame supporting a releasable pawl arranged for releasably engaging with the teeth of the first member, and the first member being rotatably supported by the frame,
   a leading end of a second member being received within a bore formed within the second end of the first member for rotatably supporting the second member with respect to the first member and permitting relative rotational rotation between the first and the second members so that the second member facilitates rotationally driving the first member in only one rotational direction,
   the second member supporting a plurality of cam followers which are spring biased radially outward away from a rotational axis of the first member,
   at least one ring member supporting a radially inward facing cam surface for releasable engaging with the plurality of cam followers, and
   a cap plate at least partially surrounding the second member and fixedly coupling the at least one ring member to the first member and rotatably coupling the second member to the first member, the cap plate being secured to the first member by a plurality of fasteners which are spaced radially from the rotational axis of the first member, and the cam and cam followers are located between the plurality of fasteners and the rotational axis of the first member.

13. The winch according to claim 12, wherein the end of the second member which is received within the bore formed within the second end of the first member has a sliding fit.

14. The winch according to claim 12, wherein the plurality of cam followers are each baised radially outward by a respective leaf spring.

* * * * *